March 5, 1940.  F. N. BLAKE  2,192,765
PIPE FINDER
Filed March 20, 1939
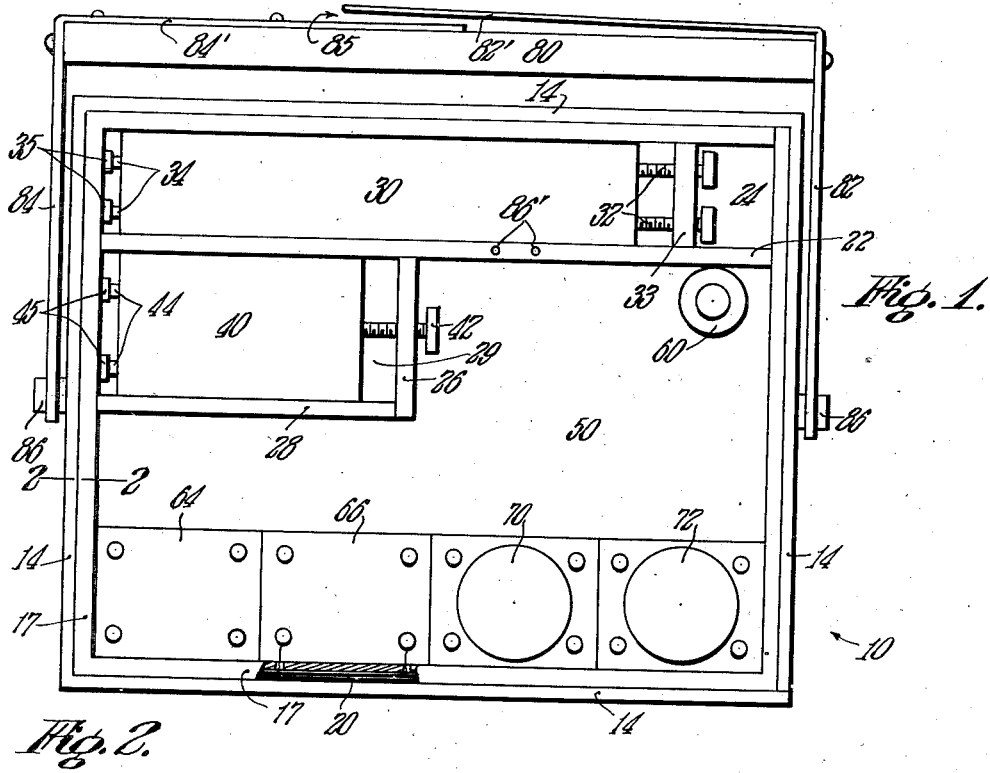
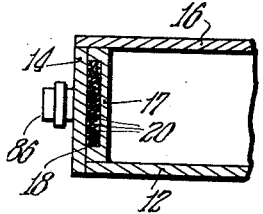
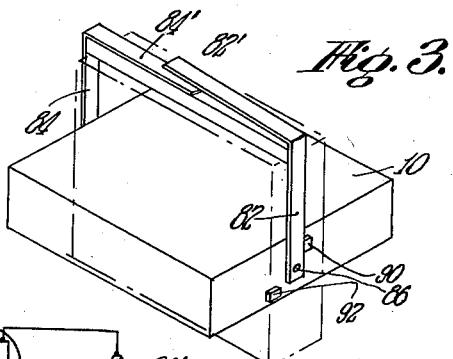
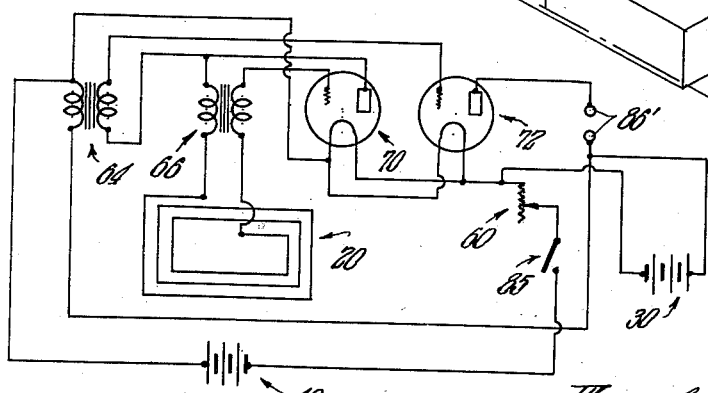
INVENTOR.
BY Frank N. Blake.
Walter C. Ross.
ATTORNEY.

Patented Mar. 5, 1940

2,192,765

UNITED STATES PATENT OFFICE 2,192,765

PIPE FINDER

Frank N. Blake, North Adams, Mass.

Application March 20, 1939, Serial No. 263,078

1 Claim. (Cl. 175—183)

REISSUED
FEB 11 1941

My invention relates to improvements in receiving apparatus adapted to constitute a part of pipe and sewer finding apparatus and the principal objects of the invention are directed toward the provision of a receiving coil and an amplifier means combined in a single compact and portable unit.

It is one object of the invention to provide a device which is equally adapted for finding either water or gas pipes or sewer pipes and by means of the novel construction, may be quickly adjusted for either purpose.

It is another object to provide a device which eliminates separate signal amplifying apparatus. When pipes or sewer pipes are buried deeply in the ground, or when noises from traffic, factories, wind or the like prevail, it is not always possible to hear distinctly without the aid of amplification. According to this invention amplification is provided within the device itself rather than have separate amplifying means.

It is a further object of my invention to provide a device which is not only a more accurate instrument than those heretofore known but which has the advantage of being simple to operate, while at the same time the device is compact in its form, sturdy in its construction and light in weight.

It is still a further object of the invention to provide an improved device which may be made more economically and with fewer parts and operations in the manufacture as well as in assembling thereof than is the case with prior devices known in the art.

Pipe finders heretofore known all have had the common objection that in order to operate them under adverse conditions separate amplifying instruments have been usually necessary so as to increase the intensities of the sounds. These separate units have been operated by means of connecting wires and cords all of which lead to the general disadvantages of, among other things, added bulk, added cost and the objectionable inconvenience of having separate units to transport and to use.

In the devices heretofore known, the amplifying unit is strapped to the operator's body or is perhaps suspended from a shoulder strap. In the case of most pipe finders, two or more men are needed to successfully operate it. This leads to considerable increase in time, labor and cost.

Various other novel features and advantages of the invention will be hereinafter more fully referred to in connection with the accompanying description of the invention, in the present preferred form thereof, reference being had to the accompanying drawing wherein:

Fig. 1 is a plan view of the device of the invention with the cover part thereof removed;

Fig. 2 is an enlarged sectional view on the line 2—2;

Fig. 3 is a small scale perspective view of the device showing the handle in combination therewith and the device in two different positions in which the device may be used and carried; and Fig. 4 is a diagrammatic wiring diagram showing the wiring of the device of the invention.

Referring now to the drawing more in detail the invention will be fully described. Like numerals in different figures refer to like parts.

The device of the invention is generally indicated by 10 and consists of a container having a bottom wall 12, side walls 14 and a cover member 16. Within the container, there is a partition 22 connecting two opposite side walls 14 so as to form a compartment 24. There are also partitions 26 and 28 substantially as shown in Fig. 1 which form another compartment 29.

Within the compartment 24 there is disposed one or more "B" batteries 30. One or more tightening screws 32 threadedly engage a strip 33 and are adapted to keep the batteries secure in their positions so as to insure and maintain direct contacts between all of the batteries disposed therein and the terminals such as 34 of the batteries with contacts 35.

Within the compartment 29 there is disposed one or more "A" batteries 40. One or more tightening screws 42 threaded in wall 26 are adapted to abut and keep the batteries in their position with terminals 44 thereof in contact with contacts 45.

In the remaining large compartment 50 there is a rheostat or variable resister 60, one or more transformers 64 and 66, and one or more vacuum tubes or triodes 70 and 72.

Around the side walls of the container and inside the side walls 14 there is disposed a U-shaped wall member 17. In the space 18 between the side wall 14 and the inner wall 17 and designated by the numeral 18 a coil of wire 20 is disposed. This receiving coil consists of a multiplicity of windings arranged to form a continuous coil. The opposite ends thereof lead into the compartment 50 and are connected to terminals of the transformer 66.

A handle for carrying the device is provided and this generally consists of a hand gripping portion 80 and side arm portions 82 and 84 which are pivoted to container at 86. The side portions may be of metal with their upper ends 82' and 84' extending along the handle with adjacent ends in overlapping relation. Preferably the said ends 82' and 84' will be arranged so that normally they are out of contact but one end such as 82' may be depressed to contact with the other end and act as a switch to close a circuit in which they are included. A pair of sockets 86' for receiving telephone cord tips are represented.

The transformers, tubes, coil, batteries, phone tip sockets, rheostat and switch are connected in a circuit or circuits as shown in Fig. 4. Signals picked up by the coil 20 are amplified so that amplified signals are delivered to the telephones connected to the phone tip sockets.

The apparatus of the invention may be used in locating pipes and various objects hidden beneath the ground or elsewhere. The operator may carry the device by means of the handle and may complete the circuit by closing the switch at any time. As the device is carried by the operator by walking around, a considerable area may be quickly covered whilst the operator wearing ear telephones may listen for audible signals.

The apparatus is adapted to pick up signals of various kinds emitted by means of various forms of apparatus, and by reason of the amplification provided, weak signals may easily be detected. By traversing the ground in such a way that the strength of the signals is noticeably increased, the operator may readily determine that he is in the proximity of the pipe or object being sought.

In some cases, according to conditions, the nature of the objective which the operator desires to locate there is a noticeably greater signal strength when the container is in the full line position shown in Fig. 3. In other cases it is desirable to have the container in the vertical position shown by dot-dash lines. The ability to locate the container and thereby the coil 20 in various positions is a decided advantage since the operator is enabled to utilize the device for the greatest efficiency.

The handle is pivotally engageable with the container by pins 86. Nuts may be used to clamp the handle securely in its position once it has been ascertained. Stops 90 and 92 are provided along the side walls of the container near to the handle 82 substantially as shown in Fig. 3. This makes it possible to maintain the handle in a rigid position relative to the container. When the container is in horizontal position the handle 82 is urged against the stop 90 as shown. When the handle is urged against the stop 92, the container is in a vertical position in reference to the handle and to the ground. Thus it will be seen that it is possible to quickly and accurately place the handle and the container in the desired relative positions.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What it is desired to claim and secure by Letters Patent of the United States is:

An electrical apparatus for locating underground pipes comprising in combination, a container having side walls and a plurality of inner walls forming compartments in said container, the side walls being provided with grooves forming a continuous groove around said container, wires extending through the groove forming a receiving coil, a means for sealing the coil in the groove, a bale member hingedly connected to said container for supporting the same and adapted to position said container in various angular positions relative thereto, a circuit switch in association with said bale member having a movable member for opening and closing a switch engageable by the hand when grasping the handle to close said circuit switch, a series of transformers in one of the compartments of said container, a series of triode units in another of the compartments of said container, connections forming a circuit including the receiving coil, said triode units, said transformers and said circuit switch, a source of energy in the circuit so formed, and a telephone receiver connected to the circuit, all adapted and arranged in co-operative relationship whereby said container may be suspended by said bale when engaged by the hand and may be positioned in horizontal and vertical positions and the movable switch member may be operated when said container is in the desired position.

FRANK N. BLAKE.